United States Patent
Virgilio et al.

(10) Patent No.: US 10,946,348 B1
(45) Date of Patent: Mar. 16, 2021

(54) DISPENSER FOR BEVERAGE BOTTLE

(71) Applicants: Raffaele Virgilio, Champlin, MN (US); Timothy M. Bottger, Brooklyn Park, MN (US)

(72) Inventors: Raffaele Virgilio, Champlin, MN (US); Timothy M. Bottger, Brooklyn Park, MN (US)

( * ) Notice: Subject to any disclaimer, the term of this patent is extended or adjusted under 35 U.S.C. 154(b) by 0 days.

(21) Appl. No.: 16/733,978

(22) Filed: Jan. 3, 2020

Related U.S. Application Data (63) Continuation-in-part of application No. 15/731,019, filed on Apr. 7, 2017, now Pat. No. 10,544,029.

(60) Provisional application No. 62/390,776, filed on Apr. 8, 2016.

(51) Int. Cl.
| | |
|---|---|
| *B67B 5/00* | (2006.01) |
| *B01F 3/04* | (2006.01) |
| *C12G 1/00* | (2019.01) |
| *B01F 5/00* | (2006.01) |
| *B01F 5/04* | (2006.01) |
| *B01F 5/06* | (2006.01) |
| *B67D 3/00* | (2006.01) |

(52) U.S. Cl.
CPC .......... *B01F 3/04787* (2013.01); *B01F 5/008* (2013.01); *B01F 5/0415* (2013.01); *B01F 5/0428* (2013.01); *B01F 5/0688* (2013.01); *B67D 3/0012* (2013.01); *B67D 3/0051* (2013.01); *C12G 1/00* (2013.01); *B01F 2003/04872* (2013.01); *B01F 2215/0072* (2013.01)

(58) Field of Classification Search
CPC .. B01F 3/04787; B01F 5/0428; B01F 5/0415; B01F 5/008; B01F 5/0688; B01F 2215/0072; B01F 2003/04872; C12G 1/00; B67D 3/0051; B67D 3/0012; B65D 25/48; B65D 25/50; B65D 25/54; B65D 88/28
See application file for complete search history.

(56) References Cited

U.S. PATENT DOCUMENTS

| | | | |
|---|---|---|---|
| 2,131,860 A | 10/1938 | Schwabenlender | |
| 2,283,652 A | * 5/1942 | Schwarzkopf | B67D 3/02 222/108 |
| 2,465,894 A | 3/1949 | Malick | |
| 2,792,018 A | 5/1957 | Turak | |
| 3,033,247 A | 5/1962 | Beall, Jr. | |
| 3,255,133 A | 6/1966 | Zimmerman et al. | |

(Continued)

FOREIGN PATENT DOCUMENTS

WO   2014101720   7/2014

OTHER PUBLICATIONS

Tenten Labs, TenTen Labs Wine Aerator Pourer (2-pack)—Decanter Premium Aerating Spout—Gift Box Included, Amazon.com, www.amazon.com/Wine-Aerator-Pourer-2-pack-Decanter/dp/B014S9NQ2.

*Primary Examiner* — Vishal Pancholi
*Assistant Examiner* — Bob Zadeh
(74) *Attorney, Agent, or Firm* — DeWitt LLP (57) ABSTRACT

A dispenser for dispensing a beverage from a beverage bottle, especially for dispensing wine from a wine bottle and facilitating the aeration of the dispensed wine while it is being poured to shorten the time normally devoted to breathing the wine. An open lesser end of the dispenser inserts into the neck of a wine bottle and preferably seals therein. A valve may be closed to temporarily preserve the wine in the bottle for later aeration while dispensing.

19 Claims, 7 Drawing Sheets

(56) References Cited

U.S. PATENT DOCUMENTS

| | | | |
|---|---|---|---|
| 3,256,916 A | 6/1966 | Silletti | |
| 3,585,963 A | 6/1971 | Hiszpanski | |
| 3,845,787 A | 11/1974 | Slagle | |
| 4,204,613 A | 5/1980 | Terzian et al. | |
| 4,473,174 A * | 9/1984 | Heuser | C12H 1/16 222/152 |
| 4,595,121 A | 6/1986 | Schulz | |
| 5,186,358 A | 2/1993 | McVay | |
| 5,743,294 A | 4/1998 | Donzella | |
| 6,427,871 B1 | 8/2002 | Suero | |
| 6,568,660 B1 * | 5/2003 | Flanbaum | B65D 47/06 222/189.07 |
| 7,527,180 B2 | 5/2009 | Allen et al. | |
| D631,291 S * | 1/2011 | Kushner | D7/213 |
| 8,011,540 B1 | 9/2011 | Peckels | |
| 8,523,019 B2 | 9/2013 | Drobot et al. | |
| 8,556,136 B2 | 10/2013 | Huynh | |
| 8,590,865 B2 * | 11/2013 | Heyman | B01F 5/043 261/111 |
| 8,783,665 B2 * | 7/2014 | Kuru | B01F 15/00928 222/566 |
| D720,959 S | 1/2015 | Mok | |
| 9,254,944 B1 | 2/2016 | Peckels | |
| 10,544,029 B1 * | 1/2020 | Virgillo | B67D 3/047 |
| 2002/0079001 A1 | 6/2002 | Blackbourn et al. | |
| 2008/0035598 A1 | 2/2008 | Simons | |
| 2009/0108022 A1 * | 4/2009 | Huggins | B67D 3/0041 222/153.04 |
| 2011/0036873 A1 | 2/2011 | Peckels | |
| 2011/0204093 A1 * | 8/2011 | Lee | B67D 1/0418 222/152 |
| 2011/0226809 A1 | 9/2011 | Malo | |
| 2012/0074172 A1 | 3/2012 | Federighi | |
| 2012/0211516 A1 * | 8/2012 | Zapp | G01F 15/075 222/20 |
| 2013/0082075 A1 | 4/2013 | Trulaske et al. | |
| 2013/0122161 A1 | 5/2013 | Cole et al. | |
| 2013/0319253 A1 * | 12/2013 | Smith | B01F 3/04751 99/323.1 |
| 2014/0091107 A1 | 4/2014 | Becker et al. | |
| 2014/0263405 A1 | 9/2014 | Dziuk et al. | |
| 2014/0263461 A1 * | 9/2014 | Prokop | B01F 13/0033 222/190 |
| 2015/0093485 A1 | 4/2015 | Kornacki | |
| 2016/0030898 A1 * | 2/2016 | Devoy | B65D 1/02 215/40 |
| 2016/0114945 A1 | 4/2016 | Carsello et al. | |
| 2016/0354733 A1 | 12/2016 | Chung | |
| 2017/0043915 A1 * | 2/2017 | Tuyls | B67D 3/0051 |

\* cited by examiner

DISPENSER FOR BEVERAGE BOTTLE

CROSS REFERENCE TO RELATED APPLICATIONS

This application is a continuation-in-part of U.S. Ser. No. 15/731,019 filed on Apr. 7, 2017, which claims the benefit of U.S. Provisional Application No. 62/390,776, filed Apr. 8, 2016, which are hereby incorporated by reference.

FIELD OF THE INVENTION

This invention relates generally to the introduction of a gas into the outflow of a contained liquid, and more specifically to a device for introducing a controlled amount of gas like air into a liquid flowing out of a container such as the aeration of wine as it is poured from a bottle.

BACKGROUND OF THE INVENTION

Wine is an alcoholic beverage usually made from the juice of grapes. Once the grapes are crushed, the resulting juice is converted by the winemaker into wine via a fermentation process using yeast. Following a clarification step in which yeast particles and other unwanted substances are removed from the wine, the product is often aged for a few years in wooden or stainless-steel barrels in order to soften harsh flavors and allow desirable flavors to develop. Finally, the wine is packaged in sealed bottles whereupon it continues to age slowly inside the bottle.

Winemaking is a complex process in which ripened grapes from a chosen variety are carefully selected at the correct time in the field to control the sugar content, flavor, and aroma. The length of contact between the grape juice and skins is also carefully controlled since it affects the color and taste of the wine. The temperature of the fermentation process must also be controlled to regulate the rate of conversion of the sugars into wine and the resulting grape aromas. Finally, the wood used for the aging barrels and time of aging will directly influence the transfer of additional flavors into the wine. All of these steps undertaken by a skilled winemaker will directly influence the flavor, aroma, and mouthfeel of the resulting wine product for the end customer.

Wine tasting is a sensory examination or appreciation of the wine using the nose, tongue, and eyes. Wines contain many chemical compounds from the grapes or other fruits used to produce the wine. The sweetness of the wine is determined by the amount of residual sugar remaining in the wine after fermentation, relative to the acidity present in the wine. Dry wines, for example, only contain small amounts of residual sugar. Again, the winemaker has carefully selected and balanced all of these factors in order to deliver a wine product with a specific flavor profile, aroma, and mouth feel to the customer who will drink the bottle of wine.

Wine is generally stored in a bottle with a cork stopper inserted into the neck of the wine bottle during the bottling operation. This stopper is meant to prevent air from entering the bottle that might spoil the wine prior to it being drunk by the customer. Too much exposure by the wine to oxygen gas contained in atmospheric air causes the wine to oxidize. All oxygen needs is a simple catalyst for this oxidation reaction to occur. Anthocyanins, catechins, epicatechins and other phenols naturally contained in the wine are very susceptible to oxidation. When oxidation does take place, the pigmentation that provides the wine its desirable color decreases along with a loss in the aromas and flavors that makes the wine pleasurable to drink. Moreover, the ethanol present within wine can also oxidize into other compounds responsible for tainted flavors and aromas. Both red and white wines will lose their vibrancy. White wines begin to brown, while red wines lose their ruddy hue to become russet or orange in color. In extreme cases of oxygen exposure, the acetaldehyde in the wine converts to acetic acid, thereby turning the wine into vinegar.

Winemakers often add compounds like sulfur dioxide or erythorbic acid to the wine during the production process to protect the wine from unwanted oxidation during the aging, inventory, and transport process, as well as the customer's storage of the wine bottle prior to consumption. But a failure of the sealing cork, such as if it becomes dry and fractures, allows such oxidation prevention compounds to escape the bottle while air enters the bottle to produce the catalyzation effect. Moreover, if a wine bottle is uncorked by a customer and left unsealed overnight, atmospheric air will easily enter the neck of the bottle to oxidize the remainder of the wine contained in the bottle.

Various devices are available within the market for evacuating atmospheric air from the interior of an opened wine bottle before it is sealed with a temporary stopper in order to reduce oxidation and spoilage of the remaining wine contained inside the bottle when it is saved for a subsequent drinking occasion. For example, U.S. Pat. No. 4,473,174 issued to Heuser discloses a wine preserver and dispenser containing a solid cap assembly that is inserted into the neck of the wine bottle. A three-way valve controls the discharge of the wine from the bottle through the influence of positive pressure produced by carbon dioxide stored inside a cartridge housed inside the cap assembly. The wine is dispensed through a discharge spigot without any need to invert the bottle during pouring in the normal manner. The carbon dioxide gas that is introduced into the bottle also acts to expel atmospheric air to preserve the wine from oxidation.

U.S. Pat. No. 8,556,136 issued to Huynh shows a wine pourer that is inserted into the neck of an opened wine bottle to provide a convenient pouring spout. Meanwhile, a ball contained inside the spout falls back into engagement with the wine bottle neck to seal the opening when the wine bottle is returned to its upright position.

Vacuum products are also available within the market. The wine drinker inserts the device into the neck of the wine bottle and then imparts a vacuum condition to withdraw atmospheric air from the bottle. When the remaining wine is to be drunk during a subsequent occasion, the device is removed from the wine bottle neck to break the vacuum seal and permit atmospheric air to reenter the bottle to push the wine out when the bottle is inverted to pour the wine.

But oxygen gas can also be beneficial to wine. The moment that wine encounters oxygen in the air, it begins to break down and "open up." The oxygen allows the juicy flavors and aromas in the wine to become more present to the drinker, thereby making it easier to identify exactly what the drinker is smelling, and hopefully the character of the wine intended by the winemaker. Exposure of the wine to oxygen also softens the mouth feel of the wine due to breaking down tannins that cause the harsh, dry sensation along the drinker's cheeks and tongue. This aeration process is especially beneficial for young red wines whose bright acidity and gripping tannins can seem unpleasant to the drinker. Finally, nasty smelling compounds contained within the wine like ethanol and sulfites and sediments evaporate.

Simply removing the wine bottle's cork to let the wine "breathe" can produce desired aeration of the newly opened wine bottle. The wine may also be poured into a wine glass and allowed to rest while it is exposed to atmospheric air's oxygen. Swirling of the wine glass prior to taking a sip helps to aerate the wine further. However, such processes for allowing wine to sit in the bottle or glass to properly aerate can take upwards of 45 minutes which is impracticable if the wine bottle is not opened well in advance of its consumption, or the wine is poured to guests at a table to be immediately consumed and enjoyed.

Wine decanters may also be used to aerate wines. Typically made from glass and exhibiting a variety of shapes and sizes, they allow the contents of the wine bottle to be poured into the decanter having an opening to atmospheric air larger than the wine bottle. Sediments contained particularly in older red wines can also settle to the bottom of the container while the wine breathes inside the decanter for several hours.

Various gadgets have therefore been developed that purport to allow a user to aerate the wine while it is being poured out of the bottle to offset the need for this long aeration time period. For example, Published PCT Application WO2014/101720 filed by Mok discloses an open-ended liquid aeration device constituting an hour-glass-shaped structure inserted into the neck of a wine bottle. The structure contains a liquid outlet channel for the wine to flow from the inverted bottle and out of the opposite end of structure which is open. An air intake channel allows air to flow into the bottle. A knob controls the air intake. But the air entering the body of the device must compete with the wine being poured from the outlet of the liquid outlet channel also contained inside the structural body. Vigorous pouring of the wine might cause the discharged volume of wine to impede the necessary inflow of air into the air intake channel for aerating the wine. Indeed, a large volume of discharged wine might even be drawn into the air intake channel to completely block the necessary air flow from entering the air intake channel for aerating the wine.

Mok seems to compensate for this competition for space within his device between the entering air and exiting wine by requiring his hour-glass shape for the liquid outlet channel and cylindrical-shaped air intake channel with a larger diameter upper portion and smaller diameter lower portion in order to produce a Venturi effect for accelerating the introduction of the air into the traveling wine. See also U.S. Design Pat. D720,959 issued to Mok.

TenTen Labs of Chicago, Ill. sells a wine aerator pourer. Mounted inside a spout that is inserted into the neck of an opened wine bottle is a metal plate containing a plurality of holes. The poured wine passes through these holes on its way to the open pour spout. The agitation of the wine caused by its interaction with the plate causes incoming air to blend with the wine. However, the Ten Labs' device allows the large volume of incoming air to flow in an unimpeded manner into the wine bottle where it can start to oxidize the wine inside the bottle while it is being consumed at the table. Thus, the character of the wine is being tainted at the same time that the device is trying to aerate the wine to improve its character.

Dispensing devices are also known within the industry for wine and liquor bottles. U.S. Pat. No. 2,283,652 issued to Schwarzkopf discloses such a dispenser apparatus that is screwed into engagement with the neck of an inverted bottle. The dispenser contains a spring-actuator valve that is closed to prevent the alcohol from flowing out of the bottle. When a glass is pushed up against cross arms radiating from the device, the valve is lifted to its open position to prevent the alcohol to flow from the bottle.

U.S. Pat. No. 3,845,787 issued to Slagle illustrates an automated liquor dispensing system in which multiple bottles in series are connected to each other by siphoning hoses. When liquor is dispensed through the nozzle of the first bottle via positive pressure produced by a pump, the volume of discharged liquor is replenished from the subsequent bottles by means of the siphoning hoses. But this device does not introduce air into the discharged liquid should the dispensing system be adapted for wine.

U.S. Pat. No. 5,186,358 issued to McVay teaches a dispenser device that may be inserted into the open neck of a bottle. A ball valve may be closed by means of a turn handle to stop the flow of the liquid contained inside the bottle.

A beverage bottle dispenser that mixes an inflowing gas like air into a discharged flow of liquid like wine while minimizing the flow of the air into the bottle itself, would be beneficial. Such a device would allow a bottle of wine to be aerated during the pouring process, while minimizing oxidation of the remaining wine contained inside the bottle. Moreover, the dispenser device should create turbulent flow of the discharged wine flow so that the incoming air flow may be thoroughly admixed into the out flowing wine in order to improve its sensory characteristics, aromas, and mouth feel.

BRIEF SUMMARY OF THE INVENTION

A dispenser for discharging a beverage from a bottle with a controlled amount of a gas thoroughly admixed into the discharged beverage is provided by the invention. The dispenser comprises a hollow frustoconical body having a sidewall, the frustoconical body having an open first end and a closed second end having a diameter larger than the diameter of the first end. The open lesser end of the dispenser device is adapted to be inserted into the necked opening of the beverage bottle. A pour path inside the device leads from a beverage inlet port in the first end to a beverage outlet port within the sidewall adjacent to the closed end. A valve situated along the pour path between the open end and closed end of the frustoconical body has a first open position for maintaining the pour path leading from the beverage inlet port to the beverage outlet port, while the second closed position of the valve interrupts the pour path. An agitation plate having a plurality of holes is positioned inside the frustoconical body downstream of the valve along the pour path. A gas inlet port within the sidewall for a gas leads to the pour path and is positioned within the frustoconical body downstream of the agitation plate. When the valve is placed in its first open position and the bottle is inverted, the beverage passing through the pour path to the beverage outlet port is subject to turbulence created by the agitation plate to break up the liquid beverage within the frustoconical body to form bubbles as the gas flowing through the gas inlet port into the pour path is thoroughly admixed into the beverage. When the valve is placed in its second closed position, the beverage contained inside the bottle is sealed to prevent exposure to the gas.

Preferably, the frustoconical body at or adjacent to the open lesser end is sheathed in a resilient frustoconical sleeve segment. The resilient frustoconical sleeve segment functions to form a seal between the frustoconical body at or adjacent to the open lesser end of the dispenser and the neck of the beverage bottle into which the open lesser end may be inserted to avoid spillage of the beverage passing through the dispenser device.

Preferably, the beverage bottle is a wine bottle which has been freshly uncorked and is filled with wine which has yet to breathe. The dispenser with its open lesser end inserted and sealed within the neck of the wine bottle defines the pour path for the wine to exit the wine bottle when the valve is in the first open position, so that the wine passes from within the wine bottle, through the neck and into the dispenser body, through the channel and valve in the first open position, then exits the dispenser body through the beverage outlet aperture adjacent the closed greater end of the device. The dispenser may be used to quickly and conveniently aerate wine while it is being poured from a bottle to improve the flavor, aroma, and mouth feel of the wine. While some air may pass through the holes in the agitation disk back into the bottle, at the same time, the size of the gas inlet port limits the amount of air that can pass back into the bottle. This feature of the dispenser device minimizes oxidation of the remaining wine contained inside the bottle. Closing the valve of the dispenser device allows the device to serve as a temporary closure for the wine bottle with any remaining wine to be sealed inside the bottle without a need for a separate sealing stopper. The minimized amount of air contained inside the bottle substantially eliminates the need to purge air from the bottle to avoid spoilage of the wine due to oxidation.

The invention also provides a method for dispensing aerated wine from a freshly uncorked bottle, the method comprising the steps of inserting the open end of the dispenser of the structure described above into the neck of the bottle, and establishing a seal by compressing a resilient sleeve between the frustoconical body adjacent to the open lesser end and the neck of the wine bottle; inverting the wine bottle so that wine from the newly opened bottle passes into the pour path, is subjected to turbulence created by the agitation plate, and encounters air passing into the pour path from the gas inlet aperture to form bubbles with the air thoroughly admixed into the wine with the resulting aerated wine flowing through the outlet aperture adjacent to the closed end of the frustoconical body. In this manner, wine from the newly opened bottle is aerated to reduce the breathing time period necessary for improving the taste, aroma and mouth feel of the wine, with the remaining wine contained inside the bottle being sealed from exposure to the air that would oxidize the wine.

DETAILED DESCRIPTION OF THE INVENTION

A dispenser for discharging a liquid beverage like wine from a bottle with a controlled amount of gas like oxygen in ambient air thoroughly admixed into the discharged beverage is provided by the invention. The device comprises a frustoconical body having a beverage inlet aperture, and beverage outlet aperture, and a gas inlet aperture located within the sidewall of the frustoconical body. A valve regulates the passage of the beverage through the device. When the dispenser device is inserted into the neck of an opened bottle, the bottle is inverted, and the valve is opened, the beverage passes along a pour path between the beverage inlet port and the beverage outlet port with the liquid beverage broken up into bubbles along the pour path by an agitation plate and the gas passing through the gas inlet aperture then becoming admixed with the bubbled beverage. In this manner, wine may be aerated as it is poured from its bottle to improve the flavor, aroma, and mouth feel characteristics of the wine. When the valve is closed, the wine no longer flows out through the pour path, while being protected from oxidization by exposure to ambient air that could spoil the wine.

In context of the present Application, "beverage" means any liquid product meant for human consumption, including but not limited to wine.

For purposes of the present invention, "gas" means any gaseous element or component that is to be efficaciously admixed into the beverage to improve its sensory characteristics, including but not limited to oxygen contained in ambient air.

For purposes of this Application, the beverage bottle dispenser 10 is described for understandability by the reader in terms of its use for treating wine that is aerated by means of oxygen gas contained in ambient air to improve the flavor, aroma, and mouth feel sensory characteristics of the wine product. But it should be understood that the beverage bottle dispenser 10 is not limited to such aeration of wine products, since the treatment of many other beverage products by means of many other gases is possible by the dispenser device of this invention.

Figure 1:
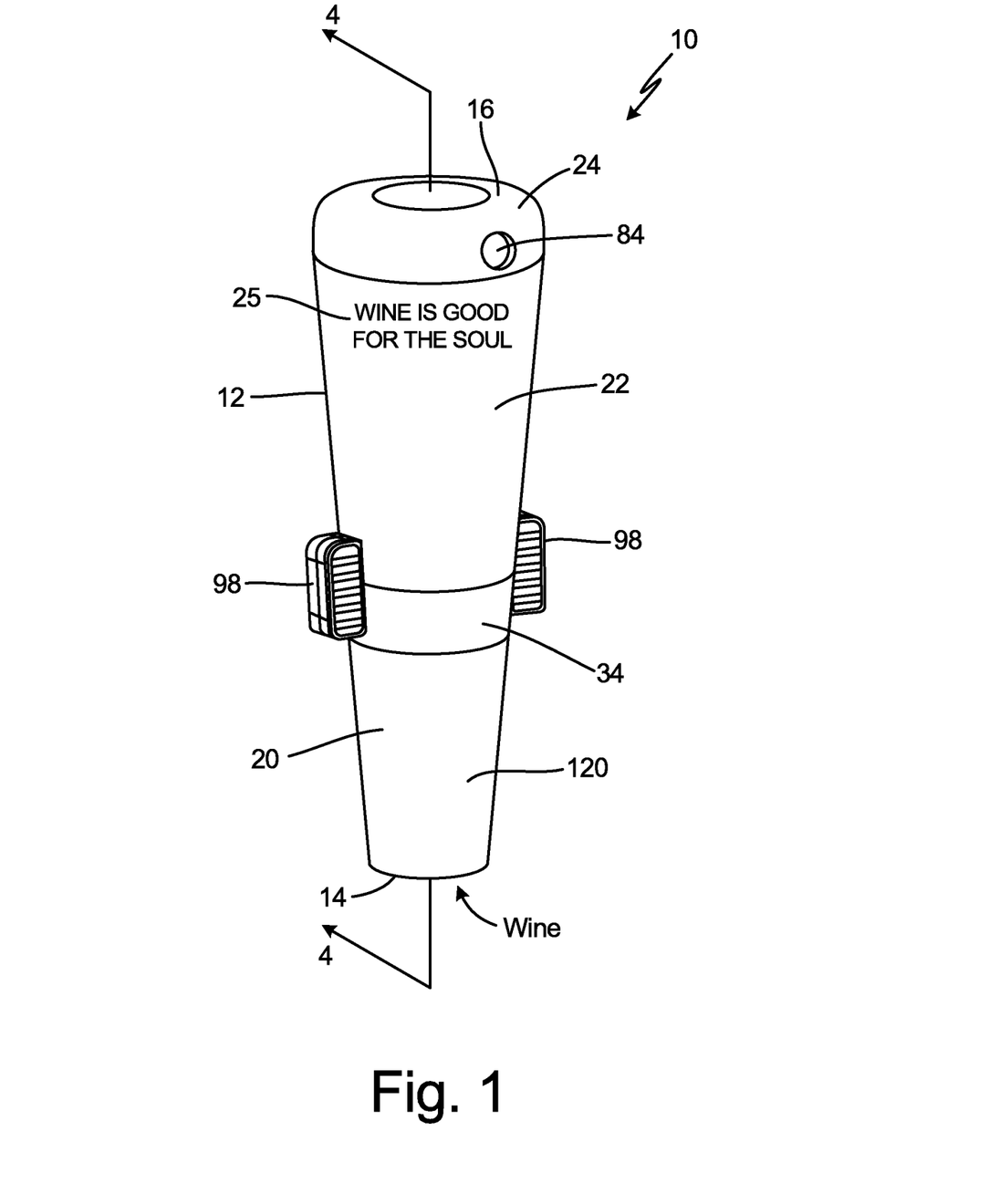
FIG. 1 schematically depicts a perspective view of a beverage bottle dispenser according to the present invention.
Figure 2:
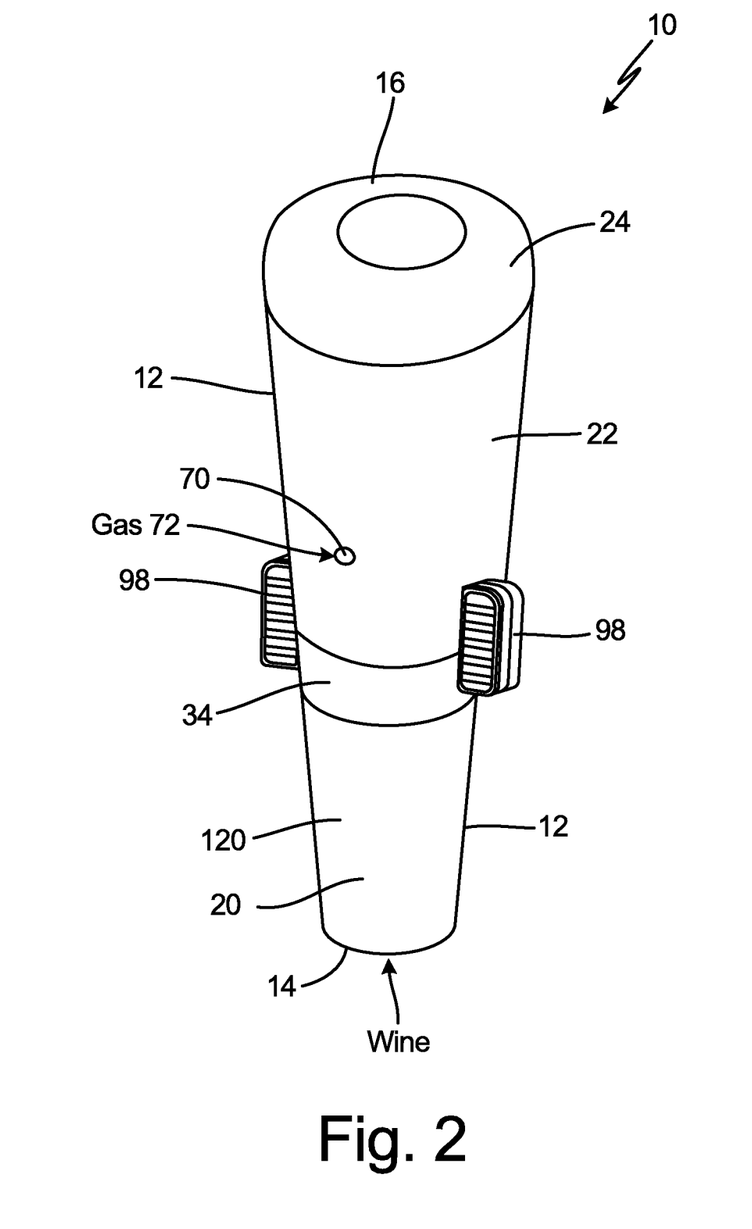
FIG. 2 schematically is a perspective view of the opposite side of the beverage bottle dispenser of FIG. 1.

The beverage bottle dispenser 10 of the present invention is depicted in FIGS. 1-5. As shown in FIGS. 1-2, the beverage bottle dispenser 10 has a frustoconical body 12 with an open lesser end 14 and a closed greater end 16, the diameter of the closed greater end being greater than the diameter of the open lesser end.

Figure 3:
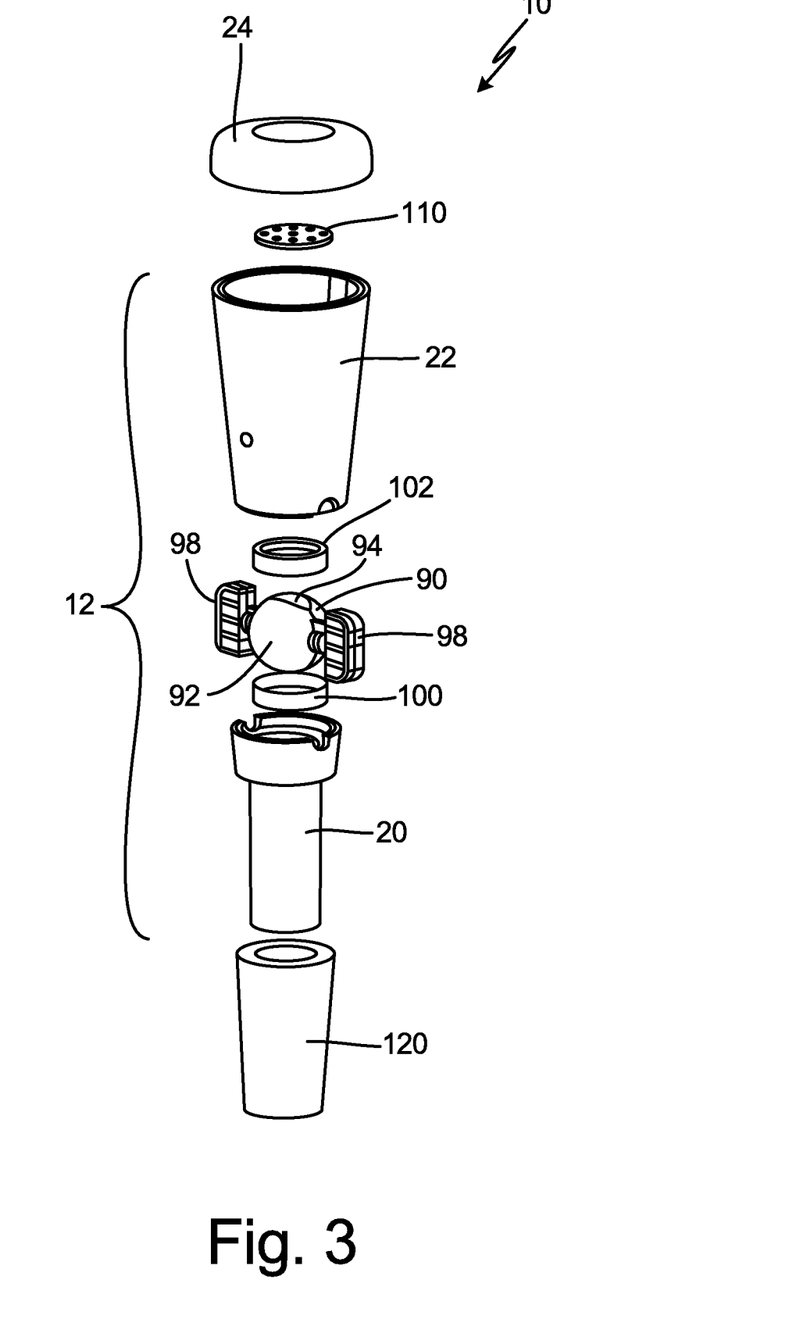
FIG. 3 is an exploded view of the beverage bottle dispenser view shown in FIG. 2.

As shown more clearly in FIG. 3, the frustoconical body 12 comprises a lower housing 20, an upper housing 22, and an end cap 24. The lower housing 20 shown more clearly in FIG. 5, in turn, comprises a body 28 having an annular ring wall 30 depending therefrom that is open at its bottom end to define beverage inlet port 32. Collar 34 formed around the upper end of body 28 has an outside diameter that is greater than the outside diameter of ring wall 30. Formed within the inside of collar 34 is circular recess 38 having a flat bottom surface 40 and a sidewall 42. Two half circle cut-away regions 44 are formed within the upper end of sidewall 42. The interior diameters of ring wall 30 and collar 34 are preferably substantially similar to provide a continuous lower channel 46 for passage of the wine that enters beverage inlet port 32. Beverage inlet port 32 is preferably oval in cross-sectional shape. The dimensions of this ovular beverage inlet port shape are about 6-7 mm×11-11.5 mm, preferably about 6.35 mm×11.25 mm.

Figure 7:
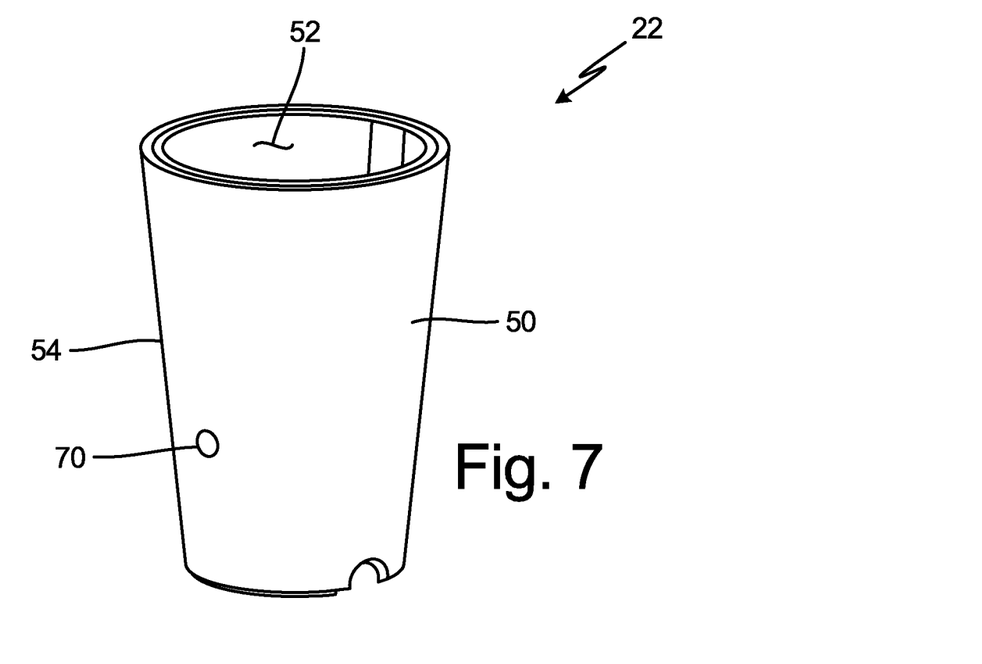
FIG. 7 is a perspective view of the upper housing for the dispenser.
Figure 8:
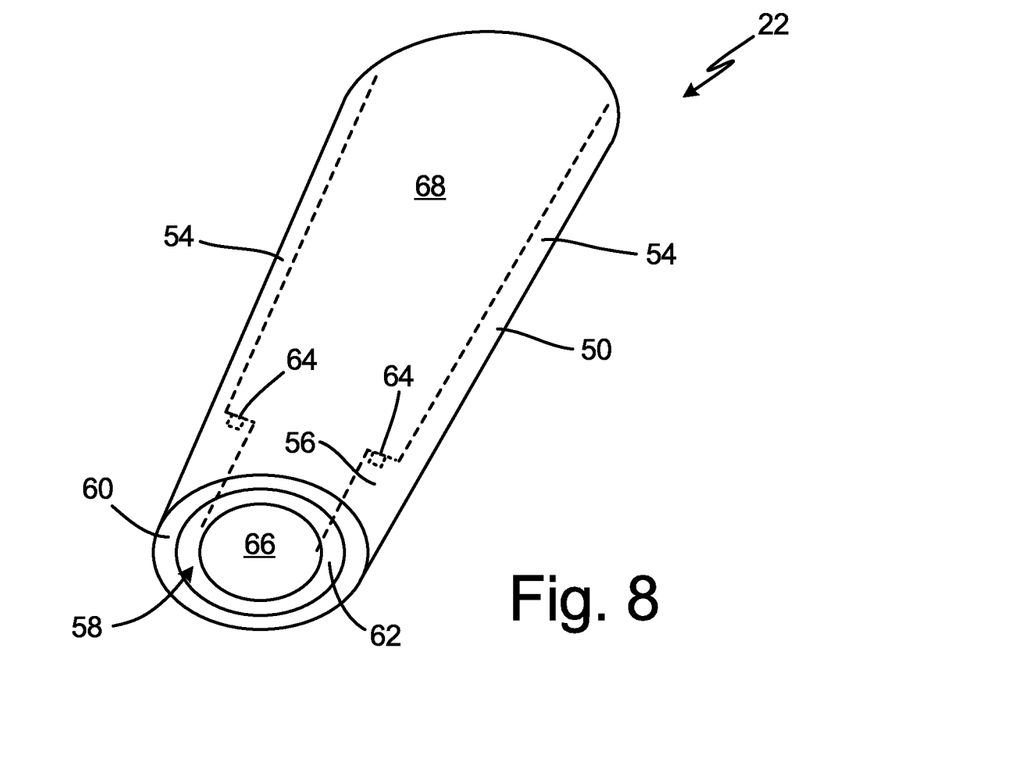
FIG. 8 is an upwards perspective view of the upper housing of FIG. 7.

The upper housing 22, in turn, is shown more clearly in FIGS. 7-8. It comprises a hollow frustoconically-shaped body 50 forming an interior region 52. The sidewall 54 of frustoconical body 50 has a ring portion 56 extending into the interior along its bottom end. This ring portion 56, in turn, has a circular recess 58 formed within its bottom end having a flat top surface 60 and a sidewall 62. Formed within the top surface of ring portion 56 is annular recess 64. The interior diameter of ring position 56 defines an upper channel 66 for carrying the wine product that passes through the beverage bottle dispenser device 10. This upper channel 66, in turn, is in open communication with interior chamber 68 that is defined by sidewall 54 of upper housing 22. Two circular cut-away regions 68 are formed within the bottom end of sidewall 54. The diameters of cut-away regions 68 should be substantially similar to the diameters of cut-away regions 44 formed within lower housing 20.

Figure 4:
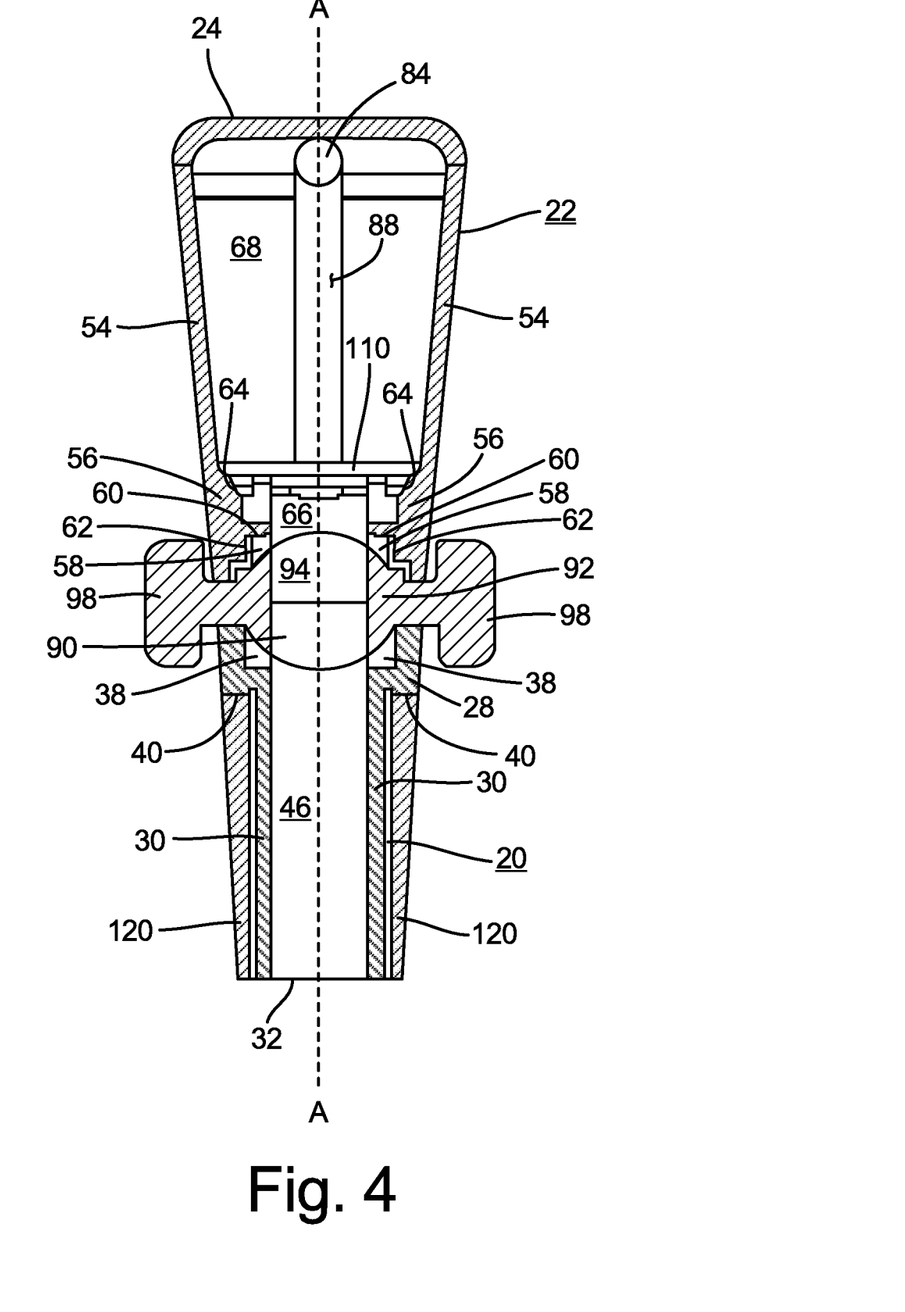
FIG. 4 is a sectional view of the dispenser of FIG. 1 which schematically depicts the valve in a first open position.
Figure 5:
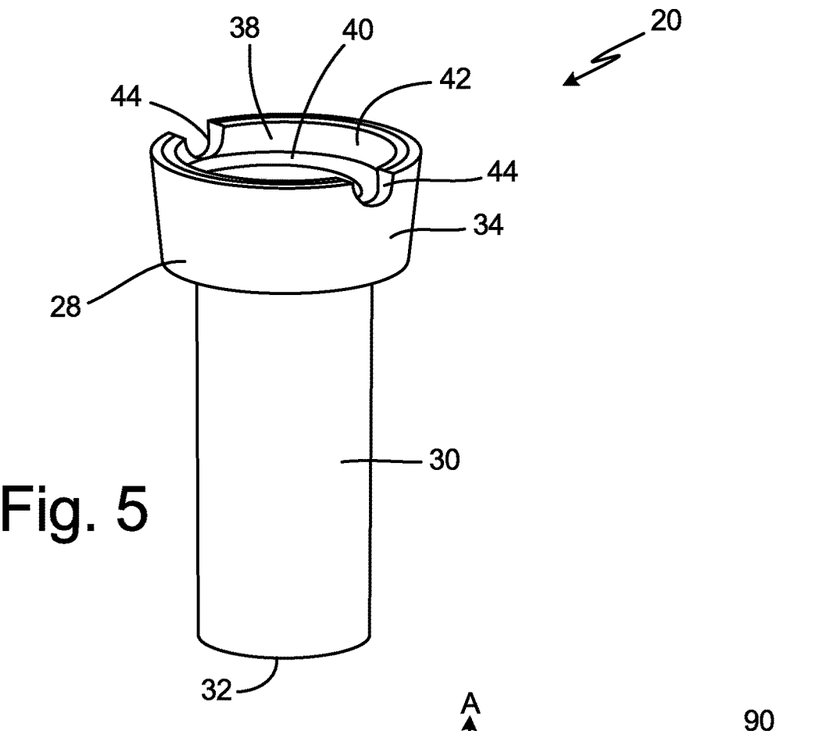
FIG. 5 is a perspective view of the lower housing for the dispenser.

Turning to FIGS. 3-4, end cap 24 fits around the top of upper housing 22. A rib 80 extending from bottom of the cap snap fits into an annular recess 82 formed within the top of sidewall 54 of the upper housing. This arrangement securely connects end cap 24 to upper housing, so that it does not become dislodged and separate from the upper housing while wine is flowing through interior chamber 68 in the upper housing. Formed within the sidewall portion of the end cap is beverage outlet port 84 (see FIG. 1). The end cap 24 acts to seal the top of upper housing 22 to produce the greater closed end 16 of beverage bottle dispenser 10. Beverage outlet port 84 is preferably circular in cross-sectional area shape. This beverage outlet port is about 5-7 mm in diameter, preferably about 5 mm in diameter.

The lower housing 20, upper housing 22, and end cap 24 may be made from a suitable clear and hard material that is food grade and can be ultrasonically welded or assembled by adhesive. Food-grade polycarbonate or polystyrene is preferred.

When assembled together, the frustoconical body 12 for the dispenser device 10 is preferably about 54 mm high, about 17 mm in diameter around the inlet of the lower housing 20, and about 36 mm in diameter at the top of the end cap 24, although other dimensions are possible.

Lower channel 46, upper channel 66, and interior chamber 68 (see FIG. 4) combine to form the pour path 86 for the wine traveling through the dispenser device 10 between beverage inlet port 32 and beverage outlet port 84. A guide channel 88 may optionally be formed within the sidewall 54 of upper housing 22 connecting with beverage outlet port 84. While wine will fill a portion of the interior chamber 68 when the dispenser device 10 is attached to the neck of an opened and inverted wine bottle being poured, this guide channel 88 may help to guide a steady stream of wine to the outlet port 84 to facilitate the pouring operation and reduce spillage of the wine exiting the outlet port 84.

A hand-operated closure valve 90 is juxtaposed between lower housing 20 and upper housing 22. While a number of different types of valves like a ball valve, PID valve, gate valve, or flapper valve may be suitable for the beverage bottle dispenser 10, the valve 90 is preferably a ball valve with an actuator extending from or through the frustoconical body. The actuator serves to move and rotate the ball valve from the first open position to the second closed position, or from the second closed position to the first open position.

Figure 6:
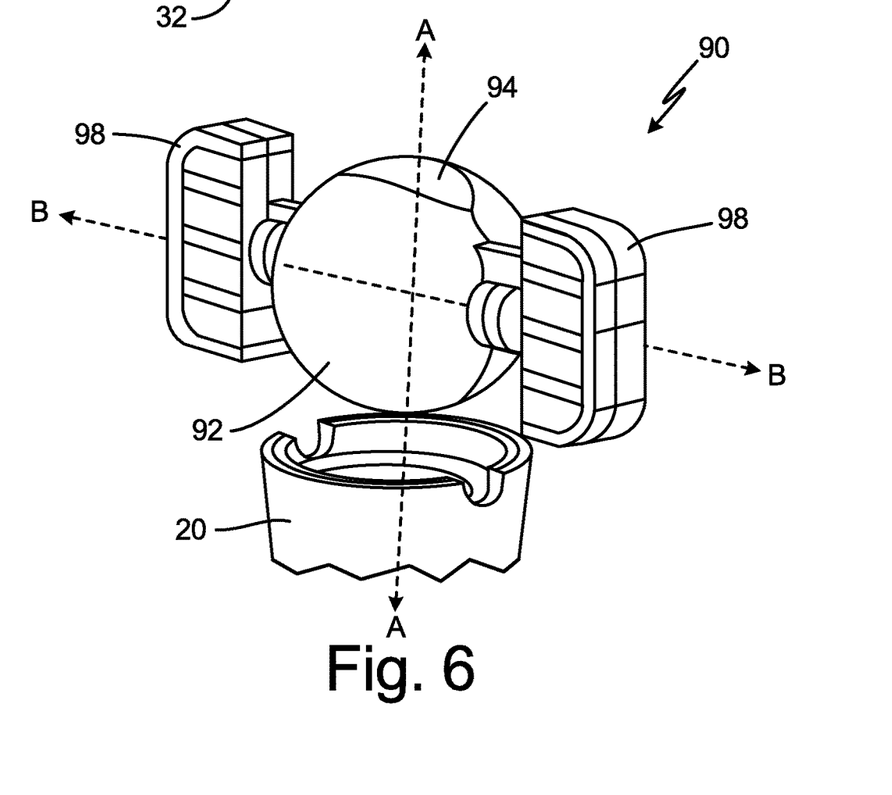
FIG. 6 is a perspective view of the ball valve for the dispenser.

As shown more clearly in FIG. 6, such a ball valve 90 comprises a spherical body 92 having a through bore 94 oriented along axis A-A coincident with pour path 86 inside the dispenser device 10. The spherical body 92 is rotated around axis B-B by means of the actuator. Handle 98 is connected to at least one end of spherical body 92 along this axis B-B. More preferably, the handle acts as a visual indication, as well as a tactile indication, of whether the ball valve is in the first open position or the second closed position. Most preferably, the actuator of the ball valve extends from both ends of the ball valve, and the indicator handle is one of a pair of indicator handles, each situated on opposite ends of the ball valve.

The material for the spherical body 92 of the ball valve could be food-grade polypropylene, high-density polyethylene ("HDPE"), or nylon with food-grade polypropylene being preferred. The surface finish for the spherical body 92 should be about 32-64, preferably about 32.

Turning to FIG. 4, ball valve 90 fits between the top end of collar 34 of lower housing 20 and the bottom end of inwardly directed collar 56 of upper housing 22. Handles 98 extend outside of the upper and lower housings. When the user rotates handles 98 to the open position to line up through bore 94 in spherical body 92 with lower channel 46 and upper channel 66, wine may freely travel along pour path 86. But, when handles are rotated by the user to the closed position to cause through bore 94 to be substantially perpendicular to lower channel 46 and upper channel 66, then the spherical body 92 in valve 90 will block the pour path 86, so that the wine may no longer travel through the beverage bottle dispenser 10 to outlet port 84. As shown in FIGS. 3-4, a lower seal 100 and an upper seal 102 may be inserted into annular recesses 38 and 58 formed within lower housing 20 and upper housing 22, respectively. These seals are annular in form, with an opening for allowing wine to pass through them. Made from an elastomeric material like food-grade polyurethane, thermoplastic urethane ("TPU"), or thermoplastic elastomer ("TPE"), the seals 100 and 102 are compressed between the valve body 92 and the lower housing 20 and upper housing 22 to prevent leakage of the wine through the holes 104 formed within the frustoconical body 12 of the beverage bottle dispenser 10 by means of the cooperating cut-away regions 44 and 68 of the lower housing 20 and upper housing 22, respectively, through which the actuator for handles 98 extend. The interference dimension for these seals 100 is about 0.2 mm. This means that when compressed, the elastomeric material of the seal will overlap the ball valve by about 0.2 mm.

Lower housing 20 and upper housing 22 may be secured together by suitable means such as adhesive or sonic welding to provide an integrated frustoconical body 12 that does not leak and contains the valve body 90, seals 100 and 102 and other parts inside.

Turning to FIGS. 3 and 4, agitation plate 110 is inserted into the exterior upper housing 22 perpendicular to axis A-A, and in a position below the gas inlet port 70 (i.e., upstream of the gas inlet port along pour path 86). This agitation plate 110 comprises a disk-shaped body 112 with a plurality of through holes 114 formed through the body 112. The agitation plate 110 may be made from any suitable food-grade, non-corrosive metal material, but 300 Series stainless steel is preferred. When the agitation plate 110 is positioned inside upper housing 22, the wine traveling along pour path inside the dispenser device 10 will reach the agitation plate whereupon a portion of the wine will strike the solid portion of the agitation plate while the remaining portion of the wine passes through holes 114. This will impart turbulent flow to the wine to break it down into discrete portions. A channel may be formed within the circumference of the interior surface of the upper housing (not shown) for containing the outer edge of the agitation plate securely in place inside the housing.

Figure 9:
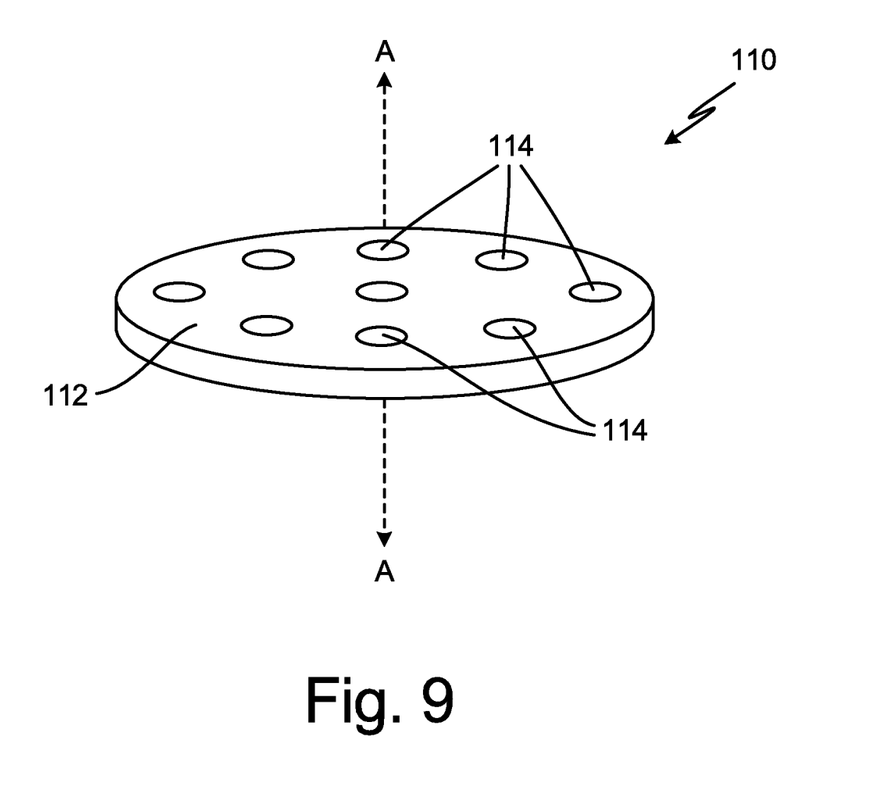
FIG. 9 is a perspective view of the agitation plate for the dispenser.

There should be about 6-10 through holes in the disk-shaped body 112, preferably about 6-10 through holes. The diameter of these through holes should be about 2-4 mm, preferably about 3.3 mm.

This turbulent flow of the wine exiting agitation plate 110 along pour path 86 will then come into communication with the ambient air gas 72 passing through gas inlet port 70 into interior chamber 68 in upper housing 22. The air will become thoroughly admixed with the discrete portions of the wine that have been broken down by the agitation plate 110 to produce an aerated wine product containing small bubbles. In this manner, the aerated wine product is produced while the wine is poured out of the bottle through the dispenser device and ultimately through beverage outlet port 84. This produces a wine product with improved flavor, aroma, and mouth feel characteristics more quickly and surely than if an opened wine bottle or wine glass was allowed to rest for 45 minutes, or wine rested in a decanter for two hours, or a prior art open-ended aeration pourer gadget is attached to the opened wine bottle. The gas inlet port 70 is about 2.5-3.5 mm in diameter, preferably about 3.0 mm in diameter.

Preferably, the gas inlet port 70 and the beverage outlet port 84 are situated on opposite sides of the channel. More preferably, the inlet aperture and the outlet aperture are situated on opposite sides of the frustoconical body 12, and the actuator and ball valve 90 are situated on the axis B-B substantially perpendicular to the axis A-A defined by the lower channel 46, upper channel 66, and interior chamber 68.

Preferably, the gas inlet port 70 has a cross-sectional area and the beverage outlet aperture 84 has a cross-sectional area, wherein the cross-sectional area of the gas inlet aperture is not more than about half of the cross-sectional area of the beverage outlet aperture. This relationship acts to limit the amount of gas that enters the upper channel 66 which can then migrate back through the holes in the agitation plate 110 back through the lower channel 46 to enter the bottle. Particularly in the case where the beverage is wine subjected to ambient air by means of the dispenser device 10 to aerate it, this limitation upon the air entering the wine bottle will reduce any oxidation of the remaining wine contained inside the bottle after the valve 90 is closed.

Moreover, the combination of the reduced size of the gas inlet port 70 relative to the beverage outlet port 84 and the relatively closed end of the upper housing 22 will produce a Venturi effect as the wine travels through the dispenser device 10. More specifically, when the wine bottle with the dispenser device attached to its open neck is inverted by the user during pouring, the wine travels through the lower housing 20 by means of gravity. A vacuum condition is created around the gas inlet port 70, thereby leading to a pressure increase in the upper housing 22. This vacuum condition will pull air through the gas inlet port 70 into the upper housing. At the same time, the increased pressure condition in the upper housing 22 will push the wine through the beverage outlet port 84 to dispense the wine. The volume of air that does migrate back through the agitation plate 110 and opened valve 90 into the bottle replaces the volume in the bottle evacuated by the discharged wine to prevent a vacuum condition from forming inside the bottle that would otherwise impede the discharge of the wine from the bottle. At the same time, the reduced volume of air that migrates back into the bottle (due to the gas inlet port 70 diameter being less than one half of the diameter of the beverage outlet port 84) minimizes oxidation of the remaining wine contained inside the bottle and the consequent need to purge air from the bottle to preserve the wine.

Normally, it takes about 2-3 seconds to fill a wine glass from a poured wine bottle. Prior art aeration pourer devices usually take about 5-6 seconds to fill the wine glass. By comparison, the dispenser device 10 of the present invention takes about 10-12 seconds to fill the wine glass. This reduced pouring speed has been found to be acceptable—especially when combined with the improved sensory flavor, aroma, and mouth feel characteristics contributed to the wine by the dispenser device 10, and the reduced need to aerate wine bottles when they are opened for prolonged time periods before pouring the wine into a glass.

The frustoconical body 12 shape of the dispenser device 10 having a smaller bottom end and a larger top end provides a "pour spout" for the wine discharged from the beverage outlet port 84 with the travel of the wine through the length of the device being enhanced by the increasing cross-sectional area along its length.

Preferably, but optionally, either or both of the closed greater end 16 or end cap 24 of the dispenser 10 or upper housing 20 adjacent to the greater closed end includes indicia 25, such as instructions and/or advertising subject matter and/or personalized information recorded concerning the particular wine in the bottle about to be dispensed or preserved by the dispenser 10.

Frustoconical sleeve 120 may be inserted around the exterior surface of ring wall 30 of lower housing 20 (see FIG. 3). Made from an elastomeric material like food grade polyurethane, thermoplastic elastomer ("TPE"), or a thermoplastic urethane ("TPU"), this frustoconical sleeve 120 becomes compressed when ring wall 30 of lower housing 20 of the beverage bottle dispenser 10 is inserted into the neck of the opened wine bottle. The sleeve seals the gap between the bottle and the dispenser to prevent wine from seeping through the gap during the pouring operation.

In the operation of the beverage bottle dispenser device 10, when a wine bottle is freshly uncorked, the dispenser 10 may be inserted into the open neck of the bottle and provide a pour path 86 within the dispenser device for the wine to be dispensed. The pour path 86 is defined as traveling from the beverage inlet port 32 of the device through the lower channel 46, through the through bore 94 of ball valve 90 when it is placed in the first open position, onward through the upper channel 66 into the interior chamber 68 toward the closed greater end 16 of the dispenser device 10, and finally exiting the dispenser 10 through the beverage outlet port 84. The bottle with the dispenser inserted into its neck is inverted and valve 90 opened. During the passage of the wine along the pour path 86, ambient air 72 entering through the gas inlet port 70 mixes and interacts with the wine so as to aerate the wine. This serves to reduce the time required for the wine to properly breathe and achieve its most desirable flavor by improving the flavor, aroma, and mouth feel characteristics of the wine. Preferably, the cross-sectional area of the gas inlet port 70 is not more than about half of the cross-sectional area of the beverage outlet port 84. This relationship between the cross-sectional area of the gas inlet port 70 and the beverage outlet aperture 84 increases the relative velocity of the air entering relative to wine exiting the dispenser device 10, and also discourages wine from inadvertently exiting through the gas inlet port 70.

The dispenser device 10 when inserted into the neck of the bottle of wine also may serve to preserve the fresh characteristics of the wine when the ball valve 90 is set to the second closed position due to preventing air flow into the wine bottle. Subsequently, when dispensing of wine may be again desired, the wine to be dispensed is nearly in the same condition as when the wine bottle was first uncorked.

The above specification and accompanying drawings provide a complete description of the structure and operation of the beverage bottle dispenser device 10 of the present invention. Since many embodiments of the invention can be made without departing from the spirit and scope of the invention, the invention resides in the claims hereinafter appended.

We claim:

1. A dispenser for dispensing a beverage from a beverage bottle having a necked opening, the dispenser comprising:
   (a) a hollow frustoconical body having a sidewall and an interior surface, the frustoconical body having a first end and a second end, the first end having less diameter than the second end, the first end being open and defining an open lesser end with a beverage inlet port, the second end having more diameter than the first end and being closed to define a closed greater end, the open lesser end being adapted to be inserted into the necked opening of the beverage bottle;
   (b) a pour path within the frustoconical body leading from the open lesser end to a distal end adjacent to the closed greater end;
   (c) a gas inlet port within the sidewall of the frustoconical body leading to the pour path, the gas inlet port being situated between the open lesser end and the closed greater end of the frustoconical body;
   (d) a beverage outlet port within the sidewall of the frustoconical body connected to the distal end of the pour path, the beverage outlet port being situated adjacent the closed greater end of the frustoconical body; and
   (e) a valve situated along the pour path between the open lesser end of the frustoconical body and the gas inlet port, the valve having a first open position and a second closed position, the first open position maintaining the pour path leading from the beverage inlet port to the beverage outlet port, the second closed position interrupting the pour path leading from the beverage inlet port to the beverage outlet port;
   (f) an agitation plate positioned inside the frustoconical body across the pour path between the valve and the gas inlet port;
   (g) wherein when the valve is placed in the valve's first open position and the bottle is inverted, the beverage passing through the pour path to the beverage outlet port is subjected to turbulent flow by the agitation plate to break the beverage into discrete portions and then exposed to a gas passing through the gas inlet port to the pour path to comingle with the beverage traveling through the pour path; and
   (h) wherein when the valve is placed in the valve's second closed position, the beverage contained inside the bottle is not exposed to the gas.

2. The dispenser of claim 1, wherein the open lesser end of the frustoconical body is sheathed in a resilient sleeve segment and wherein the resilient sleeve segment functions to form a seal between the open lesser end of the dispenser and the necked opening of the beverage bottle into which the open lesser end of the frustoconical body of the dispenser is inserted.

3. The dispenser of claim 1, wherein the beverage contained inside the bottle is wine.

4. The dispenser of claim 3, wherein the bottle has been freshly uncorked and the wine contained inside the bottle has yet to breath, the gas introduced into a channel through the gas inlet port being ambient air so that the wine dispensed through the pour path via the opened valve contacting the air passing through the gas inlet port to cause aeration of the wine inside the pour path.

5. The dispenser of claim 3, wherein the closed valve enables the dispenser to serve as a temporary replacement closure for the wine bottle to protect the wine contained inside the bottle from spoilage by the air outside the bottle.

6. The dispenser of claim 1, wherein the valve is a ball valve, the ball valve having an actuator extending from the frustoconical body, the actuator serving to move the ball valve from the first open position to the second closed position or from the second closed position to the first open position.

7. The dispenser of claim 6, wherein the actuator has an indicator handle, the indicator handle providing a visual indication of whether the ball valve is in the first open position or the second closed position.

8. The dispenser of claim 7, wherein the ball valve has a first end and a second end and wherein the actuator of the ball valve extends from the first end and the second end of the ball valve and the indicator handle is one of a pair of indicator handles, each situated on opposite ends of the ball valve.

9. The dispenser of claim 7, wherein the beverage inlet port and the beverage outlet port are situated on opposite sides of the pour path and the actuator and ball valve are situated along an axis substantially perpendicular to a plane defined by the pour path, the beverage inlet port and the beverage outlet port.

10. The dispenser of claim 1, wherein the beverage inlet port and the beverage outlet port are situated on opposite sides of the pour path within the frustoconical body.

11. The dispenser of claim 1, wherein the beverage inlet port has a cross-sectional area and the beverage outlet port has a cross-sectional area, and wherein the cross-sectional area of the beverage inlet port is not more than about half of the cross-sectional area of the beverage outlet port.

12. The dispenser of claim 1 further comprising a channel formed within the interior surface of the sidewall of the frustoconical body for guiding the beverage dispensed along the pour path to the beverage outlet port.

13. The dispenser of claim 1, wherein the closed greater end of the dispenser or the frustoconical body adjacent to the closed greater end further includes indicia.

14. A method of dispensing wine from a freshly uncorked wine bottle, the wine bottle having an open neck having an interior surface, the method comprising the steps of:
   (a) providing a dispenser, the dispenser having:
      (i) a hollow frustoconical body having a sidewall and an exterior surface, the frustoconical body having a first end and a second end, the first end having less diameter than the second end, the first end being open and defining an open lesser end with a beverage inlet port, the second end having more diameter than the first end and being closed to define a closed greater end with the open lesser end being adapted for insertion into the open neck of the wine bottle;
      (ii) a pour path within the frustoconical body leading from the open lesser end to a distal end adjacent to the closed greater end;
      (iii) a gas inlet aperture within the sidewall of the frustoconical body leading to the pour path, the gas inlet port being situated between the open lesser end and the closed greater end of the frustoconical body and permitting entry of air existing outside the dispenser;
      (iv) a beverage outlet port within the sidewall of the frustoconical body connected to the distal end of the pour path, the beverage outlet port being situated adjacent the closed greater end of the frustoconical body;

(v) a valve situated along the pour path between the open lesser end of the frustoconical body and the gas inlet port, the valve having a first open position and a second closed position, the first open position maintaining the pour path leading from the beverage inlet port to the beverage outlet port of the frustoconical body, the second closed position interrupting the pour path leading from the beverage inlet port to the beverage outlet port; and (vi) an agitation plate positioned inside the frustoconical body across the pour path between the valve and the gas inlet port;

(b) inserting the open lesser end of the wine dispenser into the neck of the wine bottle;

(c) inverting the wine bottle such that wine from the freshly uncorked wine bottle passes through the beverage inlet port into the pour path-extending to the beverage outlet port, and while passing through the pour path the wine is subjected to turbulent flow by the agitation plate to break the wine into discrete portions and then exposed to air passing into the pour path from the gas inlet port; and (d) wherein the wine from the freshly uncorked wine bottle is aerated such that breathing time period is reduced.

15. The method of dispensing wine of claim 14 further comprising the step of:

(e) placing the valve in the second closed position, such that the pour path is interrupted and the wine does not pass through the pour path, and air existing outside the dispenser is temporarily substantially prevented from entering the gas inlet port to contact any residual portion of the wine remaining in the freshly uncorked wine bottle, such that the wine is temporarily preserved for later aeration and breathing.

16. The method of dispensing wine of claim 15 further comprising the step of:

(f) placing the valve in the first open position, such that the pour path is maintained, and the wine does pass through the pour path, and contacts air entering the dispenser from the gas inlet aperture to aerate the wine passing through the pour path.

17. The method of dispensing wine of claim 14, wherein the valve is a ball valve, the ball valve having an actuator and an indicator handle on the actuator and further comprising the steps of:

(f) holding the wine bottle with the dispenser sealed thereto with a first hand; and, (g) wherein the step of placing the valve in the second closed position is performed by actuating the indicator handle and actuator with a second opposite hand.

18. The method of dispensing wine of claim 14, wherein the valve is a ball valve, the ball valve having an actuator and an indicator handle on the actuator and further comprising the steps of:

(e) holding the wine bottle with the dispenser sealed thereto with a first hand; and, (f) wherein the step of placing the valve in the first open position is performed by actuating the indicator handle and actuator with a second opposite hand.

19. The method of dispensing wine of claim 14, wherein the wine dispenser further comprises a resilient sleeve segment sheathing the exterior surface of the frustoconical body adjacent to the open lesser end of the frustoconical body, and the insertion of the open lesser end of the wine dispenser into the neck of the wine bottle establishes a seal by compressing the resilient sleeve between the exterior surface of the frustoconical body adjacent the open lesser end and the interior surface of the neck of the wine bottle.

\* \* \* \* \*